(12) United States Patent
Campeol et al.

(10) Patent No.: US 9,758,431 B2
(45) Date of Patent: *Sep. 12, 2017

(54) WATER REPELLENT ORGANOSILICON MATERIALS

(71) Applicant: Dow Corning Corporation, Midland, MI (US)

(72) Inventors: Frederick Campeol, Leval Trahegnies (BE); Fabrizio Galeone, Ressaix (BE); Jean-Paul Lecomte, Brussels (BE); Leon Marteaux, Brussels (BE); Marie-Jose Sarrazin, Brussels (BE); Brett Zimmerman, Frankenmuth, MI (US)

(73) Assignee: Dow Corning Corporation, Midland, MI (US)

( * ) Notice: Subject to any disclaimer, the term of this patent is extended or adjusted under 35 U.S.C. 154(b) by 426 days.

This patent is subject to a terminal disclaimer.

(21) Appl. No.: 14/397,653

(22) PCT Filed: May 2, 2013

(86) PCT No.: PCT/US2013/039254
§ 371 (c)(1),
(2) Date: Oct. 29, 2014

(87) PCT Pub. No.: WO2013/166280
PCT Pub. Date: Nov. 7, 2013

(65) Prior Publication Data
US 2015/0125612 A1    May 7, 2015

(30) Foreign Application Priority Data
May 2, 2012    (GB) .................................... 1207664.2

(51) Int. Cl.
C04B 24/42    (2006.01)
C04B 38/10    (2006.01)
(Continued)

(52) U.S. Cl.
CPC ............... C04B 24/42 (2013.01); B01J 13/18 (2013.01); B05D 7/06 (2013.01); C04B 20/1051 (2013.01);
(Continued)

(58) Field of Classification Search
CPC combination set(s) only.
See application file for complete search history.

(56) References Cited

U.S. PATENT DOCUMENTS 5,035,832 A    7/1991    Takamura et al.
5,356,716 A *  10/1994   Patel ................... C04B 41/4884
                                                           106/2
(Continued)

FOREIGN PATENT DOCUMENTS

CN    102186964 A    9/2011
CN    102414276 A    4/2012
(Continued)

OTHER PUBLICATIONS

International Search Report for PCT/US2013/039254 dated Jul. 23, 2013, 3 pages.
(Continued)

*Primary Examiner* — Erma Cameron
(74) *Attorney, Agent, or Firm* — Timothy J. Troy

(57) ABSTRACT

A process for increasing the hydrophobicity of a porous product by treating the product, or a composition providing for the product, with a water repellent material, characterized in that the porous product or a composition providing the product, is treated with an aqueous suspension of microcapsules where the microcapsules comprise a water repellent
(Continued)

organosilicon core material selected from an organosilane, a partially condensed organosilane and a branched siloxane resin, and a shell of a silicon-based network polymer comprising silica units.

12 Claims, 1 Drawing Sheet

(51) Int. Cl.
| | |
|---|---|
| C04B 41/49 | (2006.01) |
| C04B 41/50 | (2006.01) |
| C04B 41/00 | (2006.01) |
| C04B 41/64 | (2006.01) |
| C04B 28/02 | (2006.01) |
| C04B 28/10 | (2006.01) |
| C04B 28/14 | (2006.01) |
| C04B 20/10 | (2006.01) |
| B01J 13/18 | (2006.01) |
| C08L 83/04 | (2006.01) |
| B05D 7/06 | (2006.01) |
| C04B 103/40 | (2006.01) |
| C04B 111/27 | (2006.01) |
| B27K 3/15 | (2006.01) |

(52) U.S. Cl.
CPC ............ *C04B 28/02* (2013.01); *C04B 28/10* (2013.01); *C04B 28/14* (2013.01); *C04B 38/10* (2013.01); *C04B 41/009* (2013.01); *C04B 41/4922* (2013.01); *C04B 41/4961* (2013.01); *C04B 41/502* (2013.01); *C04B 41/64* (2013.01); *C08L 83/04* (2013.01); *B27K 3/153* (2013.01); *B27K 2240/70* (2013.01); *C04B 2103/40* (2013.01); *C04B 2111/27* (2013.01); *C08L 2207/53* (2013.01)

(56) References Cited

U.S. PATENT DOCUMENTS

| | | |
|---|---|---|
| 6,251,313 B1 | 6/2001 | Deubzer et al. |
| 6,268,423 B1 | 7/2001 | Mayer et al. |
| 8,487,020 B2 | 7/2013 | Galeone et al. |
| 8,980,377 B1* | 3/2015 | Stefanescu ............ C04B 41/483 |
| | | 252/389.3 |
| 9,005,640 B2 | 4/2015 | Bekemeier et al. |
| 2004/0256748 A1 | 12/2004 | Seok et al. |
| 2008/0188606 A1* | 8/2008 | Asada .................. C04B 41/009 |
| | | 524/442 |
| 2008/0188617 A1* | 8/2008 | Standke ................ C04B 41/009 |
| | | 524/837 |
| 2010/0152332 A1 | 6/2010 | Lecomte et al. |
| 2012/0101227 A1 | 4/2012 | Galeone et al. |

FOREIGN PATENT DOCUMENTS

| | | |
|---|---|---|
| EP | 0811584 A1 | 12/1997 |
| EP | 1471995 B1 | 7/2008 |
| WO | WO2008062018 A1 | 5/2008 |
| WO | WO2010045440 A1 | 4/2010 |

OTHER PUBLICATIONS

English language abstract for CN 102186964 extracted from espacenet.com database on Nov. 9, 2015, 2 pages.
English language abstract for CN 102414276 extracted from espacenet.com database on Nov. 9, 2015, 1 page.

* cited by examiner

Figure 1
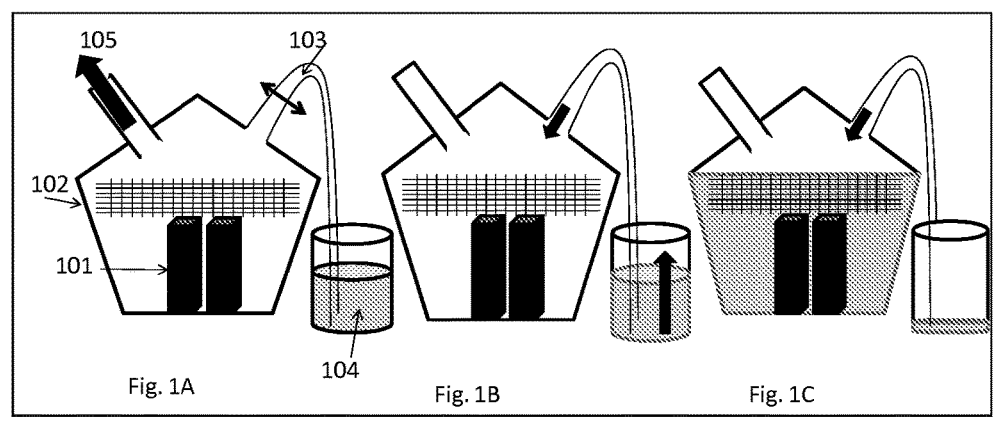
Fig. 1A　　　Fig. 1B　　　Fig. 1C
Figure 2
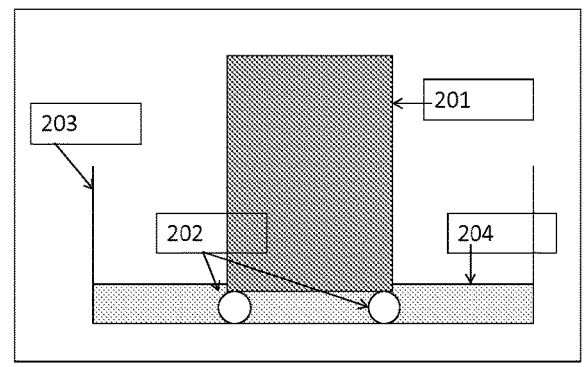

WATER REPELLENT ORGANOSILICON MATERIALS

CROSS-REFERENCE TO RELATED APPLICATIONS

This application is the National Stage of International Patent Application No. PCT/US2013/039254, filed on May 2, 2013, which claims priority to and all the advantages of Great Britain Patent Application No. GB 1207664.2, filed on May 2, 2012, the content of which is incorporated herein by reference.

TECHNICAL FIELD

This invention relates to water repellent materials used to treat porous substrates with a high tendency to absorb water in order to reduce water absorption. Examples of such porous substrates are cementitious substrates, clay-based bricks, gypsum-based substrates, lime-based substrates or wood-based substrates.

BACKGROUND

Organosilicon materials such as organosilanes or organopolysiloxanes have been used as water repellents for porous substrates. They have been used as coatings on the porous substrate or as additives incorporated into the porous substrate, for example incorporated into a cementitious composition before it is set.

EP 811584 describes a granulated hydrophobing additive in cement. The granulated additive comprises an active organopolysiloxane component a water-soluble or water dispersible binder and water-soluble, water-insoluble or water dispersible carrier particles. The additive is readily dispersible in cementitious materials upon the addition of water due to the non-hydrophobic nature of the binder and carrier of the granules.

WO 2008/062018 describes a process for preparing a granulated hydrophobing additive for cementitious material in which an organosilicon component and a binder polymer are applied to a particulate carrier from aqueous emulsion. The granulated hydrophobic additive thus prepared provides a high initial hydrophobicity to cementitious materials to which it is applied and the hydrophobicity can last during a long period of time.

U.S. Pat. No. 6,268,423 describes building compositions containing hydrophobing powders comprising silica as support material and an organosilicon compound and optionally solvent and/or water and emulsifier.

US 2012/0101227 discloses aqueous suspensions of silicate shell microcapsules wherein a first portion of the silicate shell micro-capsules contain an organopolysiloxane having at least two alkenyl groups and a hydrosilylation catalyst as Part A of a curable siloxane composition, and a second portion of the silicate shell microcapsules contain an organohydrogensiloxane as Part B of the curable siloxane composition.

U.S. Pat. No. 6,251,313 discloses the preparation of microcapsules having shell walls of organopolysiloxane and a core material, where the shell walls are produced in situ by hydrolysis and polycondensation of organosilanes and/or their condensates having not more than 4 silicon atoms.

US 2004/0256748 relates to a process for preparing silica microcapsules and more particularly, to a process for preparing silica microcapsules comprising the steps of dissolving tetraethyl orthosilicate (TEOS) into an aqueous solution containing a hydrolysis catalyst to control a degree of hydrolysis and contribute hydrophilicity or lipophilicity, adding a core material and an appropriate amount of aminopropyltrialkoxysilane(APS) as a gelling agent into the solution, and emulsifying and dispersing the resulting solution to a solution having a polarity opposite to that of the core material to microcapsulate by coating the core material with silica shell via a sol-gel reaction.

EP 0811584 discloses a cementitious material in powder form comprising cement, also comprising sufficient of a granulated hydrophobing additive, which comprises from 5 to 15 parts by weight of an organopolysiloxane component, from 10 to 40 parts by weight of a water-soluble or water-dispersible binder and from 50 to 80 parts by weight of a carrier particle, to give from 0.01 to 5% by weight of the organosiloxane component based on the weight of the cement.

Although the granulated hydrophobing additives described above have been successful in rendering cementitious materials hydrophobic, the presence of the hydrophobic organosilicon component at the surface of the formed cementitious material impacts detrimentally the paintability of the cementitious material, that is the adhesion of a post-applied coating or paint.

BRIEF SUMMARY OF THE INVENTION

An additive according to the present invention for increasing the hydrophobicity of a porous product comprises microcapsules comprising a water repellent organosilicon core material selected from an organosilane, a partially condensed organosilane and a branched siloxane resin, and a shell of a silicon-based network polymer comprising silica units.

DETAILED DESCRIPTION OF THE INVENTION

In a process according to the invention for the preparation of an encapsulated water repellent composition, a tetraalkoxysilane is added to an aqueous emulsion of a water repellent organosilicon material selected from an organosilane, a partially condensed organosilane and a branched siloxane resin, whereby the tetraalkoxysilane condenses and polymerises at the interface of the droplets in the emulsion to form microcapsules.

The water repellent organosilicon material can for example be an organosilane. A water repellent organosilane preferably comprises at least one silicon-bonded hydrolysable group whereby the organosilane can react to become bonded to a substrate such as a cementitious composition. Examples of such hydrolysable groups are alkoxy and acyloxy groups. The water repellent organosilane can for example be a dialkoxysilane or trialkoxysilane, or a mixture of these with each other or with an organopolysiloxane. The dialkoxysilane generally has the formula $R_2Si(OR')_2$ and the trialkoxysilane generally has the formula $RSi(OR')_3$ in which R in each formula represents an alkyl, substituted alkyl, aryl or substituted aryl group having 1 to 20 carbon atoms and each R' represents an alkyl group having 1 to 4 carbon atoms, preferably 1 or 2 carbon atoms. The group R can for example be substituted by a halogen, particularly fluoro, group, an amino group or an epoxy group, or an alkyl group can be substituted by a phenyl group or a phenyl group can be substituted by an alkyl group.

Preferred water repellent organosilanes comprise at least one silicon-bonded alkyl group having 1 to 30 carbon atoms.

By silicon-bonded we mean that the alkyl group is bonded directly to silicon by a Si—C bond that is not hydrolysable under normal conditions. Examples of preferred alkyl groups are those having 6 to 18 carbon atoms, for example n-octyl, 2-ethylhexyl, decyl, dodecyl or hexyl groups. Preferred water repellent organosilanes include n-octyl trimethoxysilane, 2-ethylhexyl triethoxysilane and n-octyl triethoxysilane.

The water repellent organosilane can be partially condensed by hydrolysis of alkoxy or acyloxy hydrolysable groups and siloxane condensation of the resulting Si—OH groups. If the water repellent organosilane is partially condensed, the extent of condensation is preferably limited so that the organosilane still has at least one alkoxy or acyloxy hydrolysable group per silicon atom.

The water repellent organosilicon material can alternatively be a branched siloxane resin. The branched siloxane resin comprises siloxane units of the formula $RSiO_{3/2}$ (T units) and/or siloxane units of the formula $SiO_{4/2}$ (Q units), optionally with siloxane units of the formula $R_2SiO_{2/2}$ (D units) and/or siloxane units of the formula $R_3SiO_{1/2}$ (M units), where each R represents a hydrocarbyl or substituted hydrocarbyl group.

The water repellent branched siloxane resin comprising T siloxane units of the formula $RSiO_{3/2}$ can for example be a silsesquioxane resin consisting wholly or mainly of T units. The groups R in the units of the formula $RSiO_{3/2}$ can for example be alkyl groups. It may be preferred that some or all of the alkyl groups in the units of the formula $RSiO_{3/2}$ in such a resin are alkyl groups having 1 to 30 carbon atoms, for example alkyl groups having 6 to 18 carbon atoms such as octyl groups. The water repellent branched siloxane resin can for example be an n-octyl silsesquioxane resin or an n-octyl methyl silsesquioxane resin. The groups R in the units of the formula $RSiO_{3/2}$ can be aryl groups, for example phenyl groups. Branched siloxane resins containing both alkyl and aryl groups can be used. The water repellent branched siloxane resin can for example be a phenyl silsesquioxane resin or a phenyl methyl silsesquioxane resin.

The water repellent branched siloxane resin can comprise T siloxane units of the formula $RSiO_{3/2}$ with D siloxane units of the formula $R_2SiO_{2/2}$ and/or Q siloxane units of the formula $SiO_{4/2}$ The branched siloxane resin can for example be a DT resin, a TQ resin or a DTQ resin. The branched siloxane resin can alternatively be a MQ resin comprising M siloxane units of the formula $R_3SiO_{1/2}$ and Q siloxane units of the formula $SiO_{4/2}$ Such a MQ resin preferably includes alkyl groups R having 1 to 30 carbon atoms, for example octyl groups.

The water repellent organosilicon material as defined above, for example a water repellent organosilane, may be mixed with an organopolysiloxane having reactive groups, for example an organopolysiloxane containing Si—H groups. Any organopolysiloxane present is preferably present in a smaller amount by weight than the water repellent organosilicon material as defined above.

The water repellent organosilicon material as defined above, for example a solid water repellent branched siloxane resin at room temperature, may be solubilised in a solvent, such as alkylalkoxysilane or polydimethylsiloxane, hydrocarbons, of viscosity of from 0.5 to 10 000 mPa·s. The weight ratio solvent/branched siloxane resin may be in the range of from 10:1 to 1:10.

In the process of the invention, a tetraalkoxysilane is added to an aqueous emulsion of the water repellent organosilicon material. The water repellent organosilicon material is emulsified in an aqueous medium preferably with the aid of a surfactant. The particle size of the emulsion of water repellent organosilicon material is generally in the range 0.01 to 500 µm, preferably 0.1 to 50 µm. The emulsion can alternatively be a microemulsion of particle size 10-150 nm. The surfactant can be a cationic, non-ionic or amphoteric surfactant. Cationic and/or amphoteric surfactants, which readily form an emulsion of positive zeta-potential, may be preferred. We have found that a positive zeta-potential promotes condensation and polymerisation of the tetraalkoxysilane at the interface of the emulsified droplets of the water repellent organosilane as described in EP 1471995.

Nonionic surfactants can be used either alone or in conjunction with a cationic or amphoteric surfactant; for example the cationic or amphoteric surfactant can be mixed with up to an equal weight of nonionic surfactant.

In another preferred embodiment, the process is conducted in-situ. The organosilicon material is mixed with tetraalkoxysilane then an emulsion is formed, for example with a cationic surfactant.

Examples of cationic surfactants include quaternary ammonium hydroxides such as octyl trimethyl ammonium hydroxide, dodecyl trimethyl ammonium hydroxide, hexadecyl trimethyl ammonium hydroxide, octyl dimethyl benzyl ammonium hydroxide, decyl dimethyl benzyl ammonium hydroxide, didodecyl dimethyl ammonium hydroxide, dioctadecyl dimethyl ammonium hydroxide, tallow trimethyl ammonium hydroxide and coco trimethyl ammonium hydroxide as well as corresponding salts of these materials. Chloride salts may be preferred, for example hexadecyl trimethyl ammonium chloride. Further examples of suitable cationic surfactants include fatty amines and fatty acid amides and their derivatives, basic pyridinium compounds, quaternary ammonium bases of benzimidazolines and polypropanolpolyethanol amines.

Cationic surfactants containing an organosilicon group can be used. An example of such a surfactant is N-octadecyl-N,N-dimethyl-trimethoxysilylpropylammonium chloride of the formula

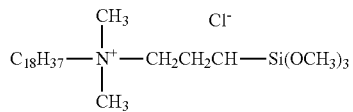

However such cationic alkoxysilanes may be more valuable when added after formation of the emulsion to act as a deposition aid, as described below.

Examples of suitable amphoteric surfactants include cocamidopropyl betaine, cocamidopropyl hydroxysulfate, cocobetaine, sodium cocoamidoacetate, cocodimethyl betaine, N-coco-3-aminobutyric acid and imidazolinium carboxyl compounds.

The above surfactants may be used individually or in combination.

Examples of non-ionic surfactants include polyoxyalkylene alkyl ethers such as polyethylene glycol long chain (12-14C) alkyl ether, polyoxyalkylene sorbitan ethers, polyoxyalkylene alkoxylate esters, polyoxyalkylene alkylphenol ethers, ethylene glycol propylene glycol copolymers, polyvinyl alcohol and alkylpolysaccharides, for example materials of the structure $R^1$—O—$(R^2O)_m$-$(G)_n$ wherein $R^1$ represents a linear or branched alkyl group, a linear or branched alkenyl group or an alkylphenyl group, $R^2$ represent an alkylene group, G represents a reduced sugar, m denotes 0 or a positive integer and n represent a positive integer as described in U.S. Pat. No. 5,035,832.

The concentration of surfactant in the aqueous emulsion of water repellent organosilicon material can be between 0.01 and 5% by weight, but is preferably below 2%, most preferably 0.02 to 1% by weight of the emulsion, particularly 0.05-0.5%.

The weight ratio of oil (organosilicon material) phase to aqueous phase in the emulsion can generally be between 40:1 and 1:50, although the higher proportions of aqueous phase are economically disadvantageous particularly when forming an emulsion of microcapsules. Usually the weight ratio of oil phase to aqueous phase is between 2:1 and 1:3.

The continuous phase of the emulsion can be a mixture of water with a water-miscible organic solvent such as an alcohol or lactam provided that the continuous phase is not miscible with the water repellent organosilicon material. The particle size (diameter) of the emulsion of organosilicon material can be reduced before addition of the water-reactive silicon compound, for example in an apparatus applying increased shear such as a homogeniser or microfluidiser, or a sonolator (ultrasonic mixer), producing an emulsion of microcapsules of particle size 200 nm to 10 µm, most preferably between 2 µm and 5 µm.

The particle size of the microcapsules produced generally corresponds to the particle size of the starting emulsion and can for example be in the range 0.01-500 µm, most preferably 200 nm to 10 µm. If microcapsules of particle size 10-500 µm, particularly up to 50 or 100 µm, are required, the aqueous phase of the emulsion preferably contains a thickener, for example polyvinylpyrrolidone, polyvinyl alcohol, bentonite clay, a cellulose derivative, particularly a cellulose ether such as sodium carboxymethylcellulose, a lightly crosslinked acrylic polymer, modified starch, an alginate or xanthan gum, to inhibit settling of the microcapsules from the emulsion during formation or subsequently. The thickener is added to the emulsion before addition of the tetraalkoxysilane.

The alkoxy groups in the tetraalkoxysilane preferably contain 1 to 4 carbon atoms, most preferably 1 or 2 carbon atoms. The tetraalkoxysilane can for example be tetraethoxysilane (tetraethyl orthosilicate or TEOS). The tetraalkoxysilane such as TEOS can be used in monomeric form or as a liquid partial condensate.

The tetraalkoxysilane hydrolyses and condenses to form a network polymer, that is a 3-dimensional network of silicon-based material, around the emulsified droplets of the water repellent organosilicon material. This 3-dimensional network consists substantially of $SiO_{4/2}$ units.

In one alternative process according to the invention, tri, di and monoalkoxysilanes are used in conjunction with the tetraalkoxysilane to provide organofunctions to the silica shell. The tri, di and monoalkoxysilanes react with the tetraalkoxysilane so that organofunctional units derived from the tri, di and monoalkoxysilane are incorporated into the network polymer which forms the shell of the microcapsules.

In one further alternative process according to the invention, a cationic alkoxysilane is used in conjunction with the tetraalkoxysilane. N-octadecyl-N,N-dimethyl-trimethoxysilylpropylammonium chloride is an example of such a cationic alkoxysilane. The cationic alkoxysilane improves the deposition of the microcapsules on a substrate from suspension, and is thus advantageous when a suspension of the microcapsules of water repellent organosilicon material is to be applied to the surface of a preformed porous product. The cationic alkoxysilane is added to the aqueous emulsion before or simultaneously with the tetraalkoxysilane. The cationic alkoxysilane reacts with the tetraalkoxysilane so that siloxane units derived from the cationic alkoxysilane are incorporated into the network polymer which forms the shell of the microcapsules.

The tetraalkoxysilane can be added to the emulsion of water repellent organosilicon material as an undiluted liquid or as a solution in an organic solvent. The tetraalkoxysilane and the emulsion are generally mixed under shear during addition and subsequently during condensation to form the silicon-based polymer shell on the surface of the emulsified droplets. Mixing can for example be by stirring, but it is preferred that the emulsion and the tetraalkoxysilane are subjected to high shear, for example in a mixer of the rotor and stator type such as a Silverson (trade mark) mixer, either during addition of the tetraalkoxysilane or after addition of the tetraalkoxysilane and before formation of microcapsules is complete. High shear mixing immediately after addition of the tetraalkoxysilane is preferred. This leads to microcapsules of reduced particle size and appears to promote polymerisation of substantially all the tetraalkoxysilane at the interface of the emulsion droplets.

The condensation reaction of the tetraalkoxysilane can be conducted at acidic, neutral or basic pH. The condensation reaction is generally carried out at ambient temperature and pressure, but can be carried out at increased temperature, for example up to 95° C., and increased or decreased pressure, for example under vacuum to strip the volatile alcohol produced during the condensation reaction. The weight ratio of water repellent organosilicon material to tetraalkoxysilane is preferably at least 1:1 and in many cases may be at least 2:1, for example 3:1 to 50:1. Smaller microcapsules, for example those formed from a microemulsion, generally have a lower ratio of organosilane to water reactive silicon compound.

A catalyst for hydrolysis and/or condensation of the tetraalkoxysilane to form the silicon-based network polymer may be used. The catalyst is preferably an oil soluble organic metal compound, for example an organic tin compound, particularly an organotin compound such as a diorganotin diester, for example dimethyl tin di(neodecanoate), dibutyl tin dilaurate or dibutyl tin diacetate, or alternatively a tin carboxylate such as stannous octoate, or an organic titanium compound such as tetrabutyl titanate. An organotin catalyst can for example be used at 0.05 to 2% by weight based on the tetraalkoxysilane. An organotin catalyst has the advantage of effective catalysis at neutral pH. A catalyst is most preferably mixed with the water repellent organosilicon material before it is emulsified, since this promotes condensation of the tetraalkoxysilane at the surface of the emulsified lipophilic droplets. A catalyst can alternatively be added to the emulsion before the addition of the tetraalkoxysilane, or simultaneously with the tetraalkoxysilane, or after the addition of the tetraalkoxysilane to harden and make more impervious the shell of silicon-based polymer which has been formed. Encapsulation can however be achieved without catalyst. The catalyst, when used, can be added undiluted, or as a solution in an organic solvent such as a hydrocarbon, alcohol or ketone, or as a multiphasic system such as an emulsion or suspension.

The product of hydrolysis and condensation of the tetraalkoxysilane is an aqueous suspension of microcapsules. The aqueous continuous phase can contain water miscible organic solvent; for example it usually contains an alcohol such as ethanol generated by hydrolysis of Si-bonded alkoxy groups. It may be advantageous to use the suspension of microcapsules as an additive to a porous product without separating the microcapsules from the suspension.

In other events, it may be advantageous to work with the microcapsules isolated from the aqueous media. Such recovery or isolation of the microcapsules from the suspension can be achieved by any known liquid removal technique, for example by spray drying, spray chilling, filtering, oven drying or lyophilisation.

The microcapsules can further be surface treated in suspension or in isolated (dry) form by the addition of tri, di or monoalkoxysilanes. Surface treatment of the microcapsules may modify compatibility, pH resistance, mechanical strength of said microcapsules.

Thus the hydrophobicity of a porous product can be increased by treating the product, or a composition providing for a porous product, with an aqueous suspension of microcapsules produced by the process of the invention as described above, optionally after dilution. The treatment can be done in adjuvant of the forming porous product or in post-treatment. This has particular advantage in post-treatment of an already formed porous product. In known processes post-treatment is generally carried out using an emulsion of a water repellent, but this leaves surfactant on the surface of the porous product. The clearest visible evidence of water repellency is 'beading', that is the formation of separated water droplets when a surface is wetted. Treatment with an emulsion does not achieve 'beading' at least initially. Treatment with the aqueous suspension of microcapsules according to the invention is a low surfactant delivery system and can achieve 'beading' soon after application. The concentration of the water repellent organosilicon material in the suspension of microcapsules applied to the formed porous product is preferably in the range 0.5% to 10% by weight, more preferably 1 to 5%, of the suspension.

The microcapsules of the invention are particularly useful in treating porous construction materials, for example cementitious substrates, clay-based substrates, gypsum-based substrates, lime-based substrates or wood-based substrates. The cementitious substrate can for example be a cement block, concrete, aerated cement or fibre reinforced cement. The clay-based substrate can for example be a brick, tile or pipe. The gypsum-based substrate can for example be plaster, gypsum panel, gypsum base. The lime-based substrate can for example be lime render. The wood-based substrate can for example be wood such as wood board or wood chips; or engineered wood such as laminated wood; plywood; OSB (Oriented Strand Board); particle board; fibre board such as insulation board, MDF (Medium Density Fiberboard) or the like. A suspension of the microcapsules of the invention has a much lower surfactant content than an emulsion of the same water repellent organosilicon material, resulting in a surface that is less wettable.

The microcapsules of the invention have the further advantage when treating porous construction materials, for example concrete or wood, that they also make the surface of the porous product oil repellent. The very low level of surfactant applied to the porous substrate by applying the microcapsules, compared to application of an emulsion, allows the water and oil repellent properties of the organopolysiloxane to be more effectively used.

Aside from post-treatment, the treatment may also be applied to compositions providing for a porous product such as cementitious compositions providing for a cementitious product or clay based compositions providing for a brick or tile product. A water repellent cementitious product can be produced by adding the microcapsules of the invention to a cementitious composition and shaping and hardening the composition to form the cementitious product. The cementitious composition can for example be concrete, aerated cement or fibre reinforced cement. The microcapsules can be added to the cementitious composition as an aqueous suspension of microcapsules produced as described above, or the microcapsules can be isolated from suspension before being added to the cementitious composition. The microcapsules are preferably added to the cementitious composition at a concentration of 0.05 to 2% by weight water repellent organosilicon material based on the cementitious composition.

Similarly a water repellent brick or tile product can be produced by adding the microcapsules of the invention to a clay based composition and shaping and hardening the clay based composition to form the brick or tile product. The microcapsules can be added to the clay based composition as an aqueous suspension of microcapsules or as isolated microcapsules. The microcapsules are preferably added to the clay composition at a concentration of 0.05 to 2% by weight water repellent organosilicon material based on the clay composition.

In these processes in which the water repellent is added to the composition before the composition is shaped and set, the microcapsules of the invention have the advantage that the water repellent is initially kept apart from the composition by the shell wall. In a cementitious composition, for example, the water repellent does not interfere with the hydrating reaction of the cement because the microcapsules survive for a time. However the high pH of the cementitious composition eventually dissolves the shell wall so that the water repellent organosilicon material is released throughout the composition to form a uniformly water repellent cementitious product.

One example of a cementitious product in which the microcapsules of the invention are particularly advantageous is an aerated cement product. The microcapsules can be added to a foamable cementitious composition. For example an aqueous suspension of microcapsules or isolated microcapsules can be added to the foamable cementitious composition. Hydrophobic materials effective as water repellents are generally also foam suppressants. Using the microcapsules of the invention, the water repellent is kept apart from the foamable composition by the shell wall of the microcapsules for a long enough time for foaming of the composition to take place.

The microcapsules of the invention can be used in other products to confer water repellency. For example the microcapsules can be incorporated in a paint or coating composition.

The invention is illustrated by the following Examples, in which parts and percentages are by weight.

BRIEF DESCRIPTION OF THE DRAWINGS

FIGS. 1 and 2 relate to evaluation of efficiency in hydrophobing wood substrates.

FIG. 1A is a schematic view of the vacuum assembly (105) where the wood blocks (101) are placed for 20 minutes, at 40 mbar, in the glass container, under the metallic wire (102). Connect (103) is connected to the water repellent solution (104), but closed (double headed arrow).

FIG. 1B is a schematic view of the addition of water repellent composition (104) to the assembly at atmospheric pressure via inlet (103).

FIG. 1C is a schematic view of the impregnation for 20 minutes at atmospheric pressure.

FIG. 2 is a schematic view of the absorption assembly where the wood blocks (201) as treated above are placed upright (on their smallest section—27×18 mm) on 2 pieces of glass (202), ensuring only 2 mm of the wood block is in contact with water (204) in container (203).

EXAMPLES

Example 1

33.3% octyltriethoxysilane was emulsified in 66.4% water containing 0.1% N-octadecyl-N,N-dimethyl-trimethoxysilylpropylammonium chloride cationic surfactant using a high shear rotor stator mixer. 1% TEOS was added to the emulsion while stirring. Microcapsules of median diameter 372 nm were produced in suspension. The microcapsules comprised a core of octyltriethoxysilane and a shell of a network polymer of TEOS comprising silica units.

The suspension of microcapsules was diluted with water so that it contained 5% octyltriethoxysilane. The diluted suspension (2.5 g) was sprayed onto six surfaces of 15×15 cm fibre reinforced cement boards and was allowed to dry and react under ambient conditions for 1 week. The water absorption of the fibre reinforced cement boards was tested by immersing the pieces of boards under a water height of 2 cm. Water absorption was measured after 1, 3, 6 and 24 hours immersions in water. The results are shown in Table 1.

Example 2

Example 1 was repeated further adding 2% TEOS to the emulsion.

Comparative Examples 1 and 2

Comparative Example C1 the cationic emulsion of octyltriethoxysilane as prepared in Example 1 was diluted to 5% active material and was sprayed onto fibre reinforced cement boards without any treatment with TEOS.

Comparative Example C2

39.4% octyltriethoxysilane and 13.1% of an octyl T resin were emulsified in 41.2% water containing 4.8% polyoxyethylene lauryl ether non ionic surfactants using a high shear rotor stator mixer. This non ionic emulsion of octyltriethoxysilane was diluted to 5% active material to compose Comparative example C2 and was sprayed onto fibre reinforced cement boards.

The results of Examples 1 and 2 and Comparative examples C1 and C2 are shown in Table 1. The water absorption of untreated fibre reinforced cement board was also measured.

TABLE 1

| Example | Water absorption 1 hour | Water absorption 3 hours | Water absorption 6 hours | Water absorption 24 hours |
|---|---|---|---|---|
| C1 | 0.40% | 0.64% | 0.92% | 2.18% |
| C2 | 0.55% | 0.92% | 1.19% | 2.13% |
| 1 | 0.37% | 0.60% | 0.81% | 1.54% |
| 2 | 0.33% | 0.59% | 0.81% | 1.63% |
| Untreated | 1.57% | 5.23% | 7.69% | 10.05% |

It can be seen from Table 1 that the encapsulated organosilanes of Examples 1 and 2 clearly give lower water absorption (better water repellency) than the emulsion of the same organosilane at the same concentration used in Comparative examples C1 and C2.

Example 4

30.3% octyltriethoxysilane was emulsified in 60.1% water containing 0.3% Arquad 16-29 cationic surfactant and 0.2% Volpo L-3 non-ionic surfactant using a high shear rotor stator mixer. 9.1% TEOS was added to the emulsion while stirring. The microcapsules comprised a core of octyltriethoxysilane and a shell of a network polymer of TEOS comprising silica units.

Mortar blocks were prepared by mixing 450 g of CEM I 42.5 R cement, 1350 g of sand, 180 g of water and hydrophobic additives. The suspension of microcapsules from Example 4 and the non ionic emulsion of silane described in Comparative example C2 were added in the mortar slurry such as to reach an addition level of active material of 0.1% vs the mortar dry composition (cement+sand). Reference mortar block containing no hydrophobic additives were prepared as well.

Mortar blocks (40×40×160 mm) were cured for 28 days at a temperature of 25° C. and at 100% relative humidity and then dried overnight at 50° C. and cooled down at room temperature before testing.

Dry blocks were weighed ($W_{dry}$) and then immersed for a period of one hour in water, with the top surface of the block at a depth of 3 cm below the water surface. After one hour the block was reweighed ($W_{wet}$). The blocks were then re-immersed for 2 additional hours (to reach an immersion time of 3 hours), and reweighed. The same sequence is then re-applied to reach immersion time of 24 hours. Results in Table 2 are obtained by use of the following equation wherein:

$$\text{Percentage Water Pick Up } (WPU\ \%) = \frac{(W_{wet}) - (W_{dry}) \times 100}{(W_{dry})}$$

TABLE 2

| Example | Water absorption 1 hour | Water absorption 3 hours | Water absorption 6 hours | Water absorption 24 hours |
|---|---|---|---|---|
| Comparative example C2 | 0.41% | 0.51% | 0.59% | 0.82% |
| Example 4 | 0.22% | 0.30% | 0.34% | 0.57% |
| Untreated | 1.47% | 2.14% | 2.55% | 2.94% |

Example 5

30.3% octyl T resin methoxy functionalised was emulsified in 60.1% water containing 0.3% Arquad 16-29 cationic surfactant and 0.2% Volpo L-3 non-ionic surfactant using a high shear rotor stator mixer. 9.1% TEOS was added to the emulsion while stirring. The microcapsules comprised a core of silsesquioxane-based active material and a shell of a network polymer of TEOS comprising silica units.

The suspension of microcapsules was diluted with water so that it contained 2% octyl T resin methoxy functionalised. The diluted suspension was sprayed onto the six surfaces of another type of fibre reinforced cement boards and was allowed to dry and react under ambient conditions for 2 days. The water absorption of the fibre reinforced cement boards was tested by immersing the pieces of boards under a water height of 2 cm. Water absorption was measured after 1, 3, 6 and 24 hours immersions in water. The results are shown in Table 3.

TABLE 3

| Example | Water absorption 1 hour | Water absorption 3 hours | Water absorption 6 hours | Water absorption 24 hours |
|---|---|---|---|---|
| Example 4 | 0.6% | 1.2% | 1.7% | 3.3% |
| Example 5 | 0.9% | 1.7% | 2.6% | 6.0% |
| Untreated | 28.9% | 29.3% | 29.5% | 30.3% |

Example 6

33.3% octyl T resin ethoxy functionalised was emulsified in 56.4% water containing 0.1% N-octadecyl-N,N-dimethyl-trimethoxysilylpropylammonium chloride cationic surfactant using a high shear rotor stator mixer. 10% TEOS was added to the emulsion while stirring. The microcapsules comprised a core of silsesquioxane and a shell of a network polymer of TEOS comprising silica units.

Aerated autoclaved blocks were prepared by mixing 40% of fine sand (<10 µm particle size), 45% CEM I 52.5 R white cement, 10% calcium hydroxide, 5% calcium sulphate hemihydrates and 0.7% of aluminium paste. Water to solid ratio is set at a value of 1.

All components were added as slurry in water and mixed sequentially. Aluminium is added at the latest stage. The mixture is then placed in an oven overnight at 50° C.

Following the reaction of aluminium paste in caustic medium, hydrogen is released and generates bubbles which are entrapped in the cement matrix which is setting at the same time. Suspension of microcapsule from example 6 was added in the slurry before addition of aluminium such as to reach an active content of 1% vs the solid composition.

Volume of the slurry after expansion and hardening is measured. The height of the hard cake obtained when no aluminium is added in the slurry is given as reference as well as the height of the hard cake obtained in the presence of aluminium but with no additive.

Extend of volume expansion is given in Table 4.

Block samples are cut so they have more or less the same weight and shape. They are weighted and then placed in a container filled with water so they are recovered by a few centimeters of water. A grid is placed over the samples to maintain them immersed (otherwise, the samples are floating).

The samples are weighted after 1, 6 and 24 hours of immersion. Just before the weighing, they are quickly wiped to remove unabsorbed water. The percentage of water uptake is calculated like this:

$$\% \text{ of water uptake after } x \text{ hours} = \frac{Wx - Wi}{Wi} \cdot 100$$

with Wx being the sample weight after x hours of immersion and Wi the initial sample weight.

Water uptakes of blocks treated with suspension of microcapsule are given in table 4. For reference, water uptakes of blocks modified with 1% of the neat octyl T resin are given as well.

TABLE 4

| Example | Cake height (cm) | Water absorption 1 hours | Water absorption 6 hours | Water absorption 24 hours |
|---|---|---|---|---|
| Neat octyl T resin | 9.1 cm | 49% | 53% | 54% |
| Example 6 | 10.3 cm | 51% | 58% | 55% |
| No additive | 10.5 cm | 113% | 118% | 119% |
| No aluminium no additive | 4.3 cm | | | |

Table 4 demonstrates clearly that addition of octyl T resin in the aerated blocks has a strong impact on the water absorption of the blocks. Water uptake is significantly decreased. Addition of suspension of microcapsule of the same octyl T resin is leading to the same reduction of water uptake, demonstrating that the active material is released during the cure mechanism; enable reaction of the active material with the cementitious matrix.

Extend of cake extension demonstrates that addition of the neat octyl T resin has a negative impact on slurry volume expansion. Volume of hardened cake is only 9.1 cm when the octyl T resin is added while volume of hardened cake in the absence of the resin is 10.5 cm. Suspension of microcapsule of the same octyl resin surprisingly has no negative impact on the slurry expansion. Height of hardened cake in the presence of the suspension of microcapsule is 10.3 cm, so almost similar to the unmodified slurry. This strongly suggests the microencapsulation enable the active material to be protected during the foaming and expansion process which last for about one hour. Rupture of the microcapsule occurs later on enable the whole cementitious matrix to be evenly treated leading to a strong reduction of water uptake.

Example 7

33.3% of water and 0.1% of cationic surfactant (Hexadecyltrimethylammonium Chloride, CTAC) are mixed at 200 RPM for 3 minutes with a propeller lab mixer. MQ resin solubilised in 100 mPa·s polydimethylsiloxane (40% wt MQ resin/60% wt polydimethylsiloxane) are mixed in the surfactant solution with the same mixer at 400 RPM for 3 minutes. The dispersion is further mixed with a high shear mixer (homogenizer). The pH of the dispersion is adjusted to =3. 10% tetraethoxysilane is added drop wise under gentle mixing. The microencapsulation is left for 24 hours to leave time to build up the capsule around the active materials droplets.

Example 8

33.3% of water and 0.1% of cationic surfactant (Hexadecyltrimethylammonium Chloride, CTAC) are mixed at 200 RPM for 3 minutes with a propeller lab mixer. MQ resin solubilised in octyl triethoxysilane (57% wt MQ resin/43% wt octyltriethoxysilane) are mixed in the surfactant solution with the same mixer at 400 RPM for 3 minutes. The dispersion is further mixed with a high shear mixer (homogenizer). The pH of dispersion is adjusted to =3. 10% tetraethoxysilane is added drop wise under gentle mixing. The microencapsulation is left for 24 hours to leave time to build up the capsule around the active materials droplets.

Examples 7 and 8 were tested for efficiency in hydrophobing wood substrates following a method of wood treatment via impregnation, and subsequent water absorption of said treated wood, versus untreated wood.

Impregnation conditions:

Wood: blocks of white pine of size: 50×27×18 mm

The blocks of pine are dried in an oven at 40° C., until a constant weight is recorded (intervals of 24 hours).

The blocks are placed under vacuum for 20 minutes, at 40 mbar (FIG. 1A). The water repellent composition is allowed to enter within the flask, submerging the wood blocks (FIG. 1B).

The blocks are immersed in the water repellent composition (1% active material) for 20 minutes, at atmospheric pressure (FIG. 1C).

The blocks are then removed and tapped dried with paper, their weight is recorded.

The blocks are then dried for 4 days in an oven at 40° C.

The impregnation level is measured by weight difference before impregnation and after impregnation+drying steps.

Effectiveness of the water repellent material:

The blocks as treated above are placed upright (on their smallest section—27×18 mm) on 2 pieces of glass, ensuring only 2 mm of the wood block is in contact with water.

Capillary forces will drive water absorption.

The blocks are then removed, tapped dried with paper, weighed and placed again on the glass rods. Weight is then recorded after 1, 3, 6, 8 and 24 hours contact with water Weight absorption is calculated as a percentage based on the weight before absorption and the weight after absorption of water.

Examples 7 and 8 show reduced water uptake versus untreated wood, as disclosed in Table 5, already after 1 hour of water contact, and up to until after 24 hours of water contact.

TABLE 5

| sample | Water uptake (% of dry wood samples weight) as a function of time (hours) | | | | | |
|---|---|---|---|---|---|---|
| | 0 h | 1 h | 3 h | 6 h | 8 h | 24 h |
| Example 7 | 0 | 1.6 | 2.9 | 4.2 | 4.9 | 8.0 |
| Example 8 | 0 | 1.7 | 3.1 | 4.4 | 5.1 | 8.4 |
| No treatment | 0 | 15.5 | 21.3 | 26.6 | 29.4 | 41.5 |

The invention claimed is:

1. A process for increasing the hydrophobicity of a porous product by treating the product, or a composition providing for the product, with a water repellent material, characterised in that the porous product or a composition providing the product is treated with an aqueous suspension of microcapsules where the microcapsules comprise a water repellent organosilicon core material selected from the group consisting of an organosilane, a partially condensed organosilane, and a branched siloxane resin, and a shell of a silicon-based network polymer comprising silica units wherein the product is selected from the group consisting of cementitious substrates, cementitious compositions, clay-based bricks, clay-based compositions, gypsum-based substrates, lime-based substrates, and wood-based substrates.

2. A process according to claim 1 wherein the water repellent organosilicon core material is an organosilane comprising at least one silicon-bonded alkyl group having 1 to 30 carbon atoms, or a partial condensation product of such an organosilane.

3. A process according to claim 2 wherein the water repellent organosilicon core material is an alkyltrialkoxysilane in which each alkoxy group has 1 to 4 carbon atoms.

4. A process according to claim 2 wherein the silicon-bonded alkyl group is an octyl group.

5. A process according to claim 1 wherein the water repellent organosilicon core material is a siloxane resin comprising siloxane units of the formula $RSiO_{3/2}$ where R represents an alkyl group.

6. A process according to claim 5 wherein the groups R in the siloxane units of the formula $RSiO_{3/2}$ comprise alkyl groups having 1 to 30 carbon atoms.

7. A process according to claim 1 wherein the water repellent organosilicon core material is a siloxane resin comprising siloxane units of the formula $RSiO_{3/2}$ where R represents an aryl group.

8. A process according to claim 1 where the microcapsules are obtained by the addition of tetraalkoxysilane to an aqueous emulsion of a water repellent organosilicon material selected from the group consisting of an organosilane, a partially condensed organosilane, and a branched siloxane resin, whereby the tetraalkoxysilane condenses and polymerises at the interface of droplets in the emulsion to form microcapsules.

9. A process according to claim 8 where a quaternised aminoalkylalkoxysilane is added to the aqueous emulsion before or simultaneously with the tetraalkoxysilane.

10. A process according to claim 1 wherein microcapsules comprising a water repellent organosilicon core material selected from the group consisting of an organosilane, a partially condensed organosilane, and a branched siloxane resin, and a shell of a silicon-based network polymer comprising silica units are added to the cementitious composition and the composition is shaped and hardened to form a cementitious product.

11. A process according to claim 10 for making a water repellent aerated cement product, wherein the microcapsules are added to a foamable cementitious composition.

12. A process according to claim 1 wherein microcapsules comprising a water repellent organosilicon core material selected from the group consisting of an organosilane, a partially condensed organosilane, and a branched siloxane resin, and a shell of a silicon-based network polymer comprising silica units are added to the clay based composition and the composition is shaped and hardened to form a brick or tile product.

* * * * *